Figure 1:
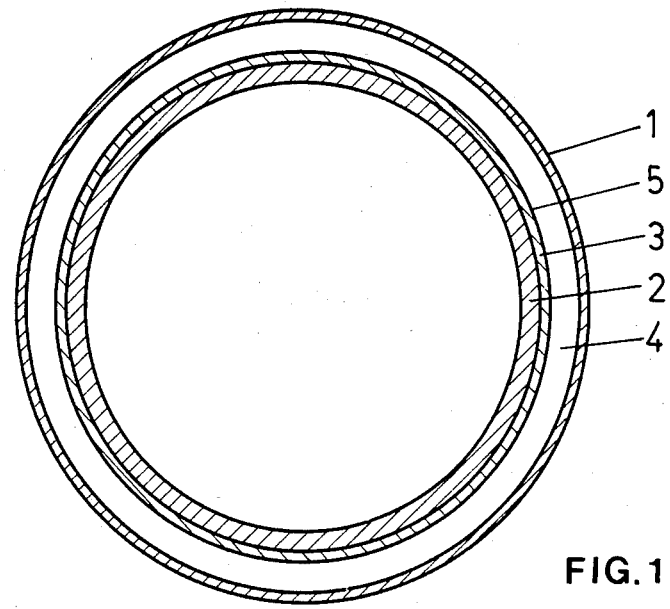

United States Patent [19]

Hirth

[11] Patent Number: 4,690,803

[45] Date of Patent: Sep. 1, 1987

[54] OZONE GENERATOR

[75] Inventor: Michael Hirth, Unterentfelden, Switzerland

[73] Assignee: BBC Brown, Boveri & Company, Limited, Baden, Switzerland

[21] Appl. No.: 851,160

[22] Filed: Apr. 14, 1986

[30] Foreign Application Priority Data

May 21, 1985 [CH] Switzerland .................. 2154/85

[51] Int. Cl.⁴ .................. B01J 19/08; B01J 19/12
[52] U.S. Cl. .................. 422/186.18; 422/186.07
[58] Field of Search .................. 422/186.04, 186.18, 422/186.19, 186.22, 186.07; 204/176; 210/760

[56] References Cited

U.S. PATENT DOCUMENTS

| 1,322,907 | 11/1919 | Klots | 422/186.18 |
| 1,505,603 | 8/1924 | Quain | 422/186.18 |
| 3,576,733 | 4/1971 | Beitzel | 422/186.18 |
| 3,671,417 | 6/1972 | Louboutin | 422/186.18 |
| 4,216,096 | 8/1980 | Paré et al. | 422/186.18 |
| 4,293,775 | 10/1981 | Feuerstake et al. | 422/186.18 |
| 4,320,301 | 3/1982 | Kogelschatz | 422/186.18 |
| 4,417,966 | 11/1983 | Krauss et al. | 422/186.18 |

FOREIGN PATENT DOCUMENTS

| 0054994 | 6/1982 | European Pat. Off. | 422/186.18 |
| 2705094 | 8/1978 | Fed. Rep. of Germany | 422/186.18 |
| 3128746 | 2/1983 | Fed. Rep. of Germany. | |
| 3442121 | 10/1984 | Fed. Rep. of Germany. | |
| 0015962 | 2/1980 | Japan | 422/186.18 |

Primary Examiner—Stephen J. Lechert, Jr.
Assistant Examiner—Howard J. Locker
Attorney, Agent, or Firm—Oblon, Fisher, Spivak, McClelland & Maier

[57] ABSTRACT

In modern ozone generators, high power densities are achievable when dielectrics (3) based on ceramics or filled plastic dielectrics and corresponding gap widths and dual cooling are used. With respect to efficiency, such ozone generators are inferior to those with a glass dielectric.

To improve the efficiency and the resistance to the discharge attack, it is proposed to glaze the titanium oxide ceramic on the surface and to coat the plastic dielectrics with a high-temperature ceramic adhesive based on $SiO_2$.

6 Claims, 2 Drawing Figures

OZONE GENERATOR

The invention relates to an ozone generator according to the preamble of Patent Claim 1 (German Offenlegungsschrift No. 3,128,746).

For very many processes, extremely large quantities of ozone of the order of magnitude of hundreds of kilograms up to tons per hour are required and, for this reason, they can be carried out in practice only if compact high-performance ozone generators are available which can deliver such large quantities of ozone.

To increase the power density of ozonisers — either those with a tubular or with a plate-shaped dielectric - glass as the dielectric as in the past has been replaced by dielectrics based on plastic or ceramics.

In fact, in an ozone generator, the quantity Y of ozone formed per unit of discharge area is proportional to the electric power W per unit area:

$$Y = K \times W$$

The electric power W is in turn proportional to the relative dielectric constant E and inversely proportional to the thickness d of the dielectric:

$$W = K' \times E/d$$

If glass is used as the dielectric, values of the dielectric constant up to $E \sim 5$ are possible. The wall thickness of such glass dielectrics must be at least 2 mm, since otherwise damage due to high thermal stresses is to be feared.

German Offenlegungsschrift No. 2,658,913 discloses an ozone generator which consists of a cooled inner electrode, an outer electrode and a high-voltage electrode arranged concentrically in between, which are each coated on their outer shell with a glass enamel dielectric. A high-frequency tubular ozone generator, in which a dielectric layer of silicate enamel or glass is applied to each of the mutually opposite surfaces of concentrically arranged metal tubes, is known from German Patent Specification No. 2,534,033. From German Offenlegungsschrift No. 2,617,059, it is known to use a thin silica gel layer, which is applied to self-supporting metal electrodes, as the dielectric in ozone generators.

An ozone generator which consists of a self-supporting ceramic tube as the dielectric, which is covered on its outer shell surface with a metal layer of an electrode and in which a metal tube is concentrically arranged as the counter-electrode, has been disclosed by German Offenlegungsschrift No. 2,354,209. Such a self-supporting ceramic tube can, however, not be made in infinitely thin dimensions and, moreover, is very prone to fracture.

An ozone generator, the electrodes of which consist of decarburised steel and are coated with a thin ceramic layer as the dielectric, is known from German Offenlegungsschrift No. 2,065,823. Such ceramic layers must, however, be burned in at relatively high temperatures, which can lead to troublesome distortion of the self-supporting metal electrodes.

A dielectric for ozone generators, which consists of a ceramic material containing $Al_2O_3$, $SiO_2$ and at least one alkali metal oxide or alkaline earth metal oxide and has a dielectric constant between 5 and 10 and a thickness of 0.5 mm to 1 mm, is known from German Auslegeschrift No. 2,618,243.

In all the non-glass dielectrics described above, the power density and hence the ozone yield can in principle be increased.

According to the discoveries made by the applicant, the surface of the dielectric exerts a decisive influence on the efficiency. In this respect, dielectrics based on ceramics or synthetic resins are inferior to glass dielectrics.

It is the object of the invention to provide a dielectric of the type set out above, which has a high relative dielectric constant and a relatively high breakdown strength, so that a high ozone yield is obtained with thin layers of the order of magnitude of 100 um, and which is the equal of glass dielectrics with respect to efficiency.

According to the invention, the object is achieved when the surface, facing the discharge gap, of the dielectric is coated with a protective layer containing $SiO_2$.

In the case of dielectrics which essentially consist of titanium dioxide, the protective layer preferably consists of a passivating glass fused on, whereas, in the case of dielectrics based on plastics, the protective layer consists of a high-temperature ceramic adhesive based on $SiO_2$.

In the case of the latter, a pretreatment with a high-temperature adhesive based on $Al_2O_3$ is advisable for improved bonding to the base material.

In all cases, an improvement in efficiency is achievable, which reaches the values of gas dielectrics. Furthermore, the ceramic layers additionally impart to the plastic dielectric a substantially higher resistance to the surface attack by the partial discharges.

The invention is explained in more detail below by reference to two illustrative embodiments.

Figure 2:
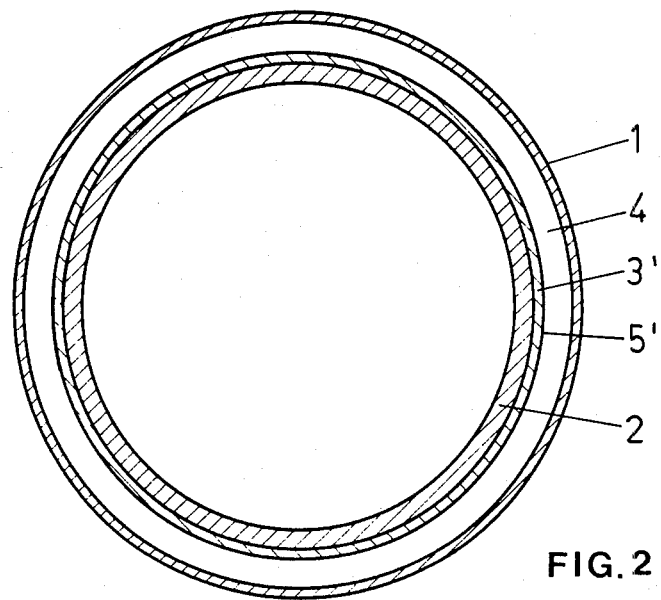

In the drawing:

FIG. 1 shows a cross-section through a tubular ozoniser having a titanium dioxide dielectric with glass passivation, and FIG. 2 shows a cross-section through a tubular ozoniser having a filled plastic dielectric.

In FIG. 1, a first metallic electrode is marked 1 and a second metallic electrode is marked 2. On the surface facing the first electrode 1, the second electrode 2 carries a dielectric layer 3 of titanium oxide ceramic. The discharge gap 4, of typically 0.6 to 2 mm width, of the ozone generator is located between the layer 3 and the first electrode.

To this extent, the structure so far corresponds to the known ozonisers with a titanium oxide dielectric, such as are manufactured and sold by, for example, Messrs. U.S. Ozonair Corporation, 464 Cabot Road, South San Francisco, Calif. 94080 (compare the U.S. Journal OZONEWS, volume 9, number 9, 1980, page 2).

According to the invention, the layer 3 is provided with a protective layer 5 of passivating glass on the surface facing the discharge gap 4. This is a fusedon glass layer, such as is nowadays used for many types of silicone semiconductor components in order to improve the quality and reliability.

All the essential details with respect to the composition, application of the protective layer 5 and layer thickness are to be found in the company brochure "Schott Produkt Information No. 4841 — Passivierungsgläser für Halbleiterbauelemente - Passivating glasses for semiconductor components" of Messrs.

Jenaer Glaswerk Schott & Gen., Landshut Works, D-8300 Landshut 2 undated, publication No. 4841dXI/79 o.P.

In the same way as for the passivation of silicone wafers, the passivating glass supplied in powder form is applied, in the subject matter of the invention, in an organic suspension (solution of 2% of nitrocellulose in 2-(2-butoxyethoxy)-ethyl acetate) by whirlercoating, brushing, dipping or electrophoresis. After the suspending agent has been evaporated (about ten minutes in the temperature range 350°–450° C.), the glass layer is produced within a period of about five minutes at about 700° C.

In the second embodiment of the invention according to FIG. 2, the dielectric consists of a curable plastic, filled with dielectric powder, such as is described, for example, in German Offenlegungsschrift No. 3,128,746 or in German Offenlegungsschrift No. 3,442,121 (German Patent Application No. P 34 42 121.1 of 17.11.84 by the applicant or in Swiss Patent Application No. 5099/84-4 of 25.10.84). The layer 3 contains a multiplicity of $TiO_2$ grains 5 in a more or less uniform distribution and interposed barium titanate grains 6. The two types of grains are embedded in a thermo$etting, preferably anhydride-hardened epoxide resin having a relative dielectric constant of $\epsilon_r \approx 3.5$. The thickness of the dielectric layer 3 is between 1 and 5 mm, preferably 2.5 to 3 mm. The barium titanate powder has a grain size of less than 1 um and has a relative dielectric constant of $\epsilon_r \approx 2,000$.

The coarse grains consist of $TiO_2$ with grain sizes between 5 and 100 um and a relative dielectric constant of $\epsilon_r \approx 100$. They are obtained by sintering fine-grained $TiO_2$ and subsequent comminution.

With a layer of such a structure, which contains about 42% by volume of synthetic resin, about 20% by volume of barium titanate powder and about 38% by volume of coarse-grained $TiO_2$, a relative dielectric constant of the complete layer of about $\epsilon_r \approx 30$ was obtained, the long-term breakdown strength being more than 2,000 V/mm.

A layer 3 with a mixture of glass beads and electric corundum as the coarse-grained constituent of the dielectric layer gave comparable values.

The surface, facing the discharge gap 4, of the layer 3 is coated with a ceramic adhesive based on silica ($SiO_2$). This protective layer can be applied by spraying-on or dipping and is baked for about 50 hours at about 100° C.

For improved bonding to the base material, a pretreatment with a ceramic adhesive based on $Al_2O_3$ is advisable.

The two ceramic adhesives are described, for example, in the company brochure "Keramik-Produkte fur Hoch-Temperaturen - Ceramic products for high temperatures" of Messrs. Kager GmbH, D-6000 Frankfurt/M.61/updated, Type 989 being described there as a priming or adhesion-promoting layer and Type 918 as a covering layer.

Even though the plastic dielectrics according to the abovementioned patent application, due to their special structure, very well withstand the attack by the partial discharges, the resistance can be increased yet further by means of the coating according to the invention with the ceramic adhesive.

I claim:

1. In an ozone generator with a first and a second metallic electrode and a layer of a dielectric material of titanium dioxide ceramic or of plastic filled with a dielectric power on that surface of the second electrode which faces the first electrode, and a discharge gap between the first electrode and the dielectric layer, the improvement comprising that the surface facing the discharge gap of the dielectric layer is coated with a protective glass or ceramic layer based on silica ($SiO_2$).

2. Ozone generator according to claim 1, wherein the dielectric layer is of titanium dioxide ceramic, and its free surface is coated with a protective layer of passivating glass.

3. Ozone generator according to claim 2, wherein the dielectric layer is between 5 and 500 μm thick.

4. Ozone generator according to claim 1, wherein the dielectric layer is of plastic filled with a dielectric powder, and its free surface is coated with a high-temperature ceramic adhesive based on $SiO_2$.

5. Ozone generator according to claim 4, wherein an interlayer based on $Al_2O_3$ is provided as an adhesion-promoter between the dielectric layer and the ceramic adhesive layer.

6. Ozone generator according to claim 4 or 5, wherein the thickness of the dielectric layer is between 10 and 500 μm.

* * * * *